United States Patent
Mihelich et al.

(10) Patent No.: US 10,530,680 B2
(45) Date of Patent: Jan. 7, 2020

(54) LINK AGGREGATION AND DYNAMIC DISTRIBUTION OF NETWORK TRAFFIC IN A SWITCHING CLOS NETWORK

(71) Applicant: Fortinet, Inc., Sunnyvale, CA (US)

(72) Inventors: Joseph R. Mihelich, Folsom, CA (US); JingJing Du, Santa Clara, CA (US); Amit Srivastav, Dublin, CA (US)

(73) Assignee: Fortinet, Inc., Sunnyvale, CA (US)

(*) Notice: Subject to any disclaimer, the term of this patent is extended or adjusted under 35 U.S.C. 154(b) by 1 day.

(21) Appl. No.: 15/685,246

(22) Filed: Aug. 24, 2017

(65) Prior Publication Data

US 2019/0068485 A1 Feb. 28, 2019

(51) Int. Cl.
*H04L 12/709* (2013.01)
*H04L 12/721* (2013.01)
*H04L 12/803* (2013.01)
*H04L 12/713* (2013.01)
*H04Q 11/00* (2006.01)
*H04L 12/931* (2013.01)

(52) U.S. Cl.
CPC .......... *H04L 45/245* (2013.01); *H04L 45/586* (2013.01); *H04L 45/66* (2013.01); *H04L 47/125* (2013.01); *H04L 49/70* (2013.01); *H04Q 2011/0056* (2013.01)

(58) Field of Classification Search
CPC ..... H04L 45/245; H04L 45/586; H04L 45/66; H04L 49/70; H04Q 2011/0056
See application file for complete search history.

(56) References Cited

U.S. PATENT DOCUMENTS

| | | | |
|---|---|---|---|
| 2015/0188808 A1* | 7/2015 | Ghanwani | H04L 45/48 709/244 |
| 2016/0149724 A1* | 5/2016 | Wang | H04L 12/46 370/392 |
| 2016/0352622 A1* | 12/2016 | Gautam | H04L 45/66 |

OTHER PUBLICATIONS

"Media Access Control (MAC) Bridges." IEEE Standard for Local and metropolitan area networks. IEEE Std 802.1D™-2004 (Revision of IEEE Std 802.1D-1998) 802.1DTM. Jun. 9, 2004. 281 pgs.
"Path Bridging—Design and Evolution." 802.1aq Shortest. IEEE. 2012. 15 pgs.
Terpstra, M., http://www.plexxi.com/2014/08/mlag-example-complexity/. 3 pgs.
Hicks, G., "Network Remote Job Entry Program—NETRJS." Network Working Group. Apr. 6, 1972. 9 pgs.

\* cited by examiner

*Primary Examiner* — Andrew Lai
*Assistant Examiner* — Harry H Kim
(74) *Attorney, Agent, or Firm* — Jaffery Watson Mendonsa & Hamilton, LLP

(57) ABSTRACT

Systems and methods are described for link aggregation and dynamic distribution of network traffic in a switching Clos network. In one embodiment of the present invention, a spine switch of a Clos network learns a first mapping of a Media Access Control (MAC) address of a client device to a first port of the spine switch and a second mapping of the MAC of the client device to a second port of the spine switch. The spine switch aggregates the first mapping and the second mapping as a link group for the MAC address of the client device in a MAC address table and distributes network traffic destined for the MAC address of the client device among members of the link group.

20 Claims, 4 Drawing Sheets

LINK AGGREGATION AND DYNAMIC DISTRIBUTION OF NETWORK TRAFFIC IN A SWITCHING CLOS NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of networking techniques. In particular, various embodiments relate to link aggregation and dynamic distribution of network traffic in a switching Clos network.

Description of the Related Art

A switching Clos network is divided into a spine layer and an edge layer. In a switching Clos network, multiple links are connected between spine switches and edge switches to increase redundancy and improve bandwidth. However, without special care, redundant links between spine switches and edge switches cause trouble in the switching Clos network. Classical solutions leverage the Spanning Tree Protocol (IEEE 802.1D) and/or link aggregation protocol (IEEE 802.1ad) which aim to flatten the network into a single path with fat pipes. More recent solutions use Transparent Interconnection of Lots of Links (TRILL RFC 325), Shortest Path Bridging (SBP IEEE 802.1aq) or Multi-chassis LAG (MLAG) which attempt to move beyond the limitations imposed by spanning tree's single paths by allowing traffic to flow along multiple simultaneous paths between endpoints. When client devices are connected to multiple edge switches for redundancy and improved bandwidth, the switching Clos network breaks down as the client is seen on multiple edge switches. A possible solution would be to utilize MLAG between two edge switches. This provides a limited solution. Therefore, there is a need for a solution that is not limited to two edge switches and does not require the complexity of MLAG.

SUMMARY

Systems and methods are described for link aggregation and dynamic distribution of network traffic in a switching Clos network. In one embodiment of the present invention, a spine switch of a Clos network learns a first mapping of a Media Access Control (MAC) address of a client device to a first port of the spine switch and a second mapping of the MAC of the client device to a second port of the spine switch. The spine switch aggregates the first mapping and the second mapping as a link group for the MAC address of the client device in a MAC address table and distributes network traffic destined for the MAC address of the client device among members of the link group.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
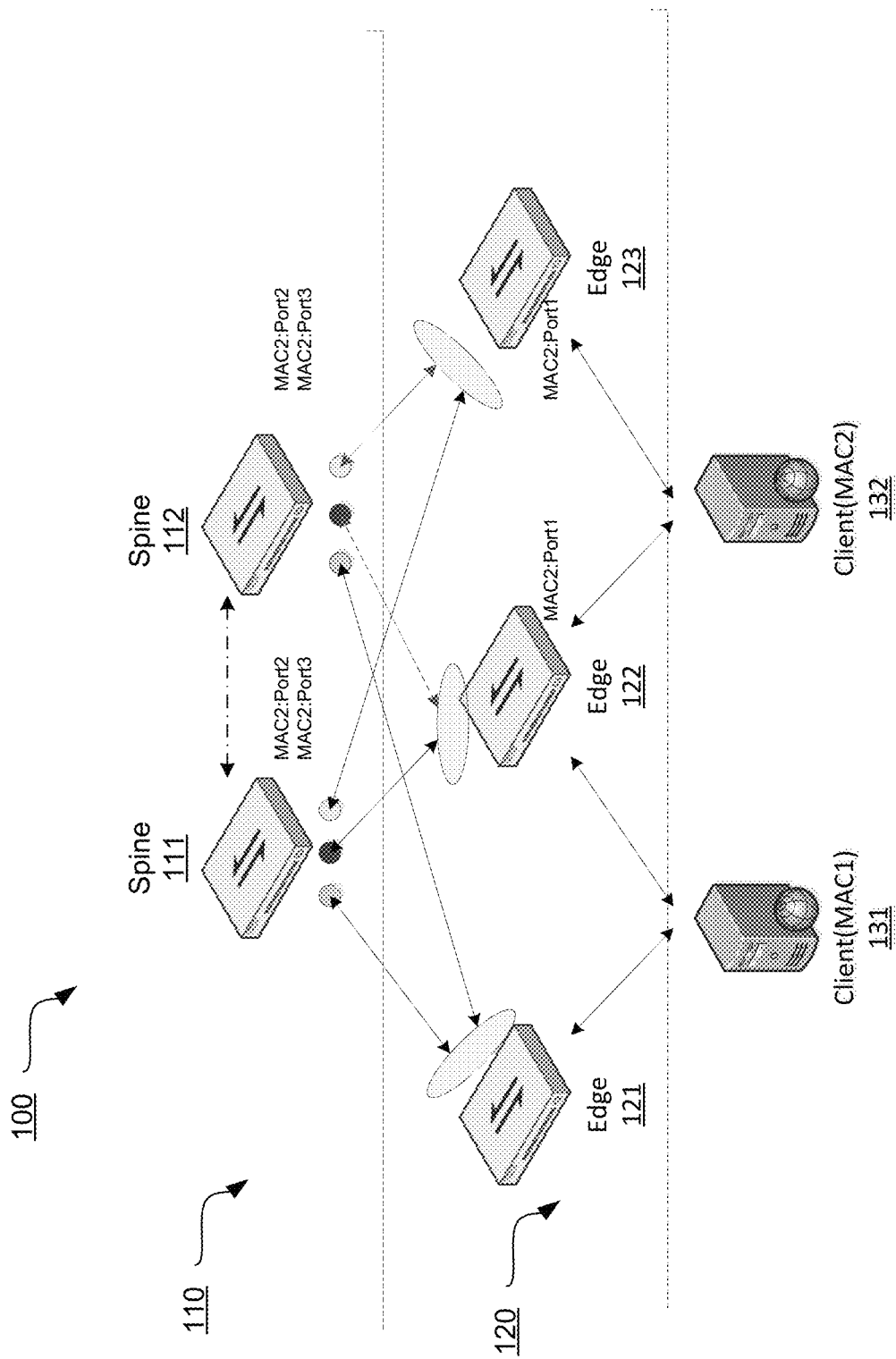
FIG. 1 illustrates an exemplary switching Clos network architecture in accordance with an embodiment of the present invention.

Systems and methods are described for link aggregation and dynamic distribution of network traffic in a switching Clos network. In one embodiment of the present invention, a spine switch of a Clos network learns a first mapping of a Media Access Control (MAC) address of a client device to a first port of the spine switch and a second mapping of the MAC address of the client device to a second port of the spine switch. The spine switch aggregates the first mapping and the second mapping as a link group for the MAC address of the client device in a MAC address table and distributes network traffic destined to the MAC address of the client device among members of the link group.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary switching Clos network architecture 100 in accordance with an embodiment of the present invention. In this example, switching Clos network architecture 100 may be divided into a spine layer 110 and an edge layer 120. Spine layer 110 may comprises multiple spine switches represented, in this simplified example, by spine switch 111 and spine switch 112. Edge layer 120 may comprises multiple edge switch represented, in this simplified example, by edge switches 121-123. There are multiple client devices (represented by client 131 and 132) that are connected to edge switches 120. In network architecture 100, each of client devices 131 and 132 connects to multiple edge switches for redundancy and improved bandwidth. Therefore, there are multiple links from a client to a spine switch through multiple edge switches. For example, client 132 connects to port 2 of spine switch 111 through edge switch 122 while client 132 connects to port 3 of spine switch 111 through edge switch 123. When network traffic is transmitted from client 132, the network traffic is dispatched to edge switches 122 and 123 by client 132. Then, the network traffic may be forwarded by edge switches 122 and 123 to ports 2 and 3 of spine switch 111. As the source MAC address of the network traffic is the MAC address (i.e., MAC2) of client 132, spine switch 111 will observe MAC2 at both ports 2 and 3.

In a prior art spine switch, when a MAC address is observed on a port of the spine switch, the mapping of the MAC address with the port is recorded in a MAC address table (a/k/a a forwarding table). When the same MAC address is observed on another port, the MAC address table is updated with the new mapping of the MAC address to the other port. As such, when multiple links between a client and a spine switch exist, network traffic from the same client received at multiple ports of a given spine switch may cause the spine switch to continually re-align its MAC address table to point to the most recent link on which the client's MAC address was observed.

In accordance with embodiments of the present invention, the above mentioned MAC address re-alignment problem incurred by observing the same client device on multiple links is addressed by aggregating the multiple links into a link group. Further, network traffic to be transmitted to the client device may be distributed among the members of the link group. Meanwhile, as the spine switches of a Clos network may have the same or similar links with client devices, link groups of a spine switch may be shared with other spine switches. Further, each switch of the Clos network keeps learning the MAC address table while forwarding network traffic, the MAC address tables of edge switches of the Clos network may be shared with spine switches and spine switches may learn that multiple links exist between clients and spine switches from the MAC address tables of the edge switches. Learning such multiple links and aggregating these multiple links for network distribution in a Clos network is described further below with reference to FIGS. 2 and 3.

Figure 2:
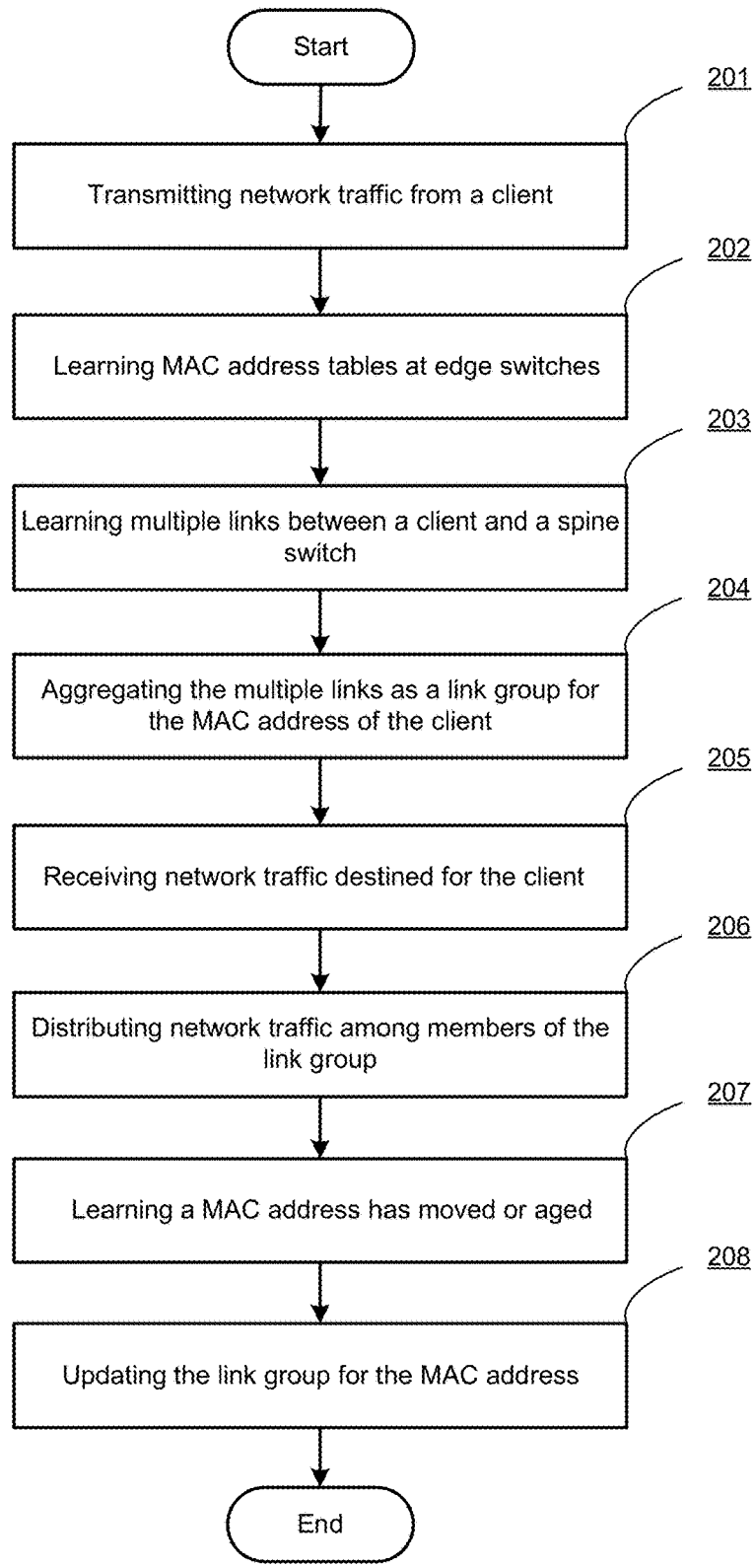
FIG. 2 is a flow diagram illustrating a method for dynamically distributing network traffic in a switching Clos network in accordance with an embodiment of the present invention.

FIG. 2 is a flow diagram illustrating a method for aggregating multiple links into a link group and dynamically distributing network traffic in a switching Clos network, such as network 100 of FIG. 1.

At block 201, network traffic is transmitted from a client device, such as client 132. In the present example, client 132 may include multiple single-port network interface cards (NICs) or a multiple-port NIC and each port connects to an edge switch, such as edge switch 122 or 123. The multiple-port NIC or the multiple NICs of client 132 may be bonded as a virtual NIC and egress data frames are dispatched to any of the ports of the virtual NIC based on, for example, round robin scheduling. Egress data frames of client 132 have a source address that is set to a MAC address (i.e., MAC2) of client 132.

At block 202, multiple edge switches receive data frames from the client and learn mappings of the MAC address of the client to ports of the edge switches. The mappings of the MAC address to ports are stored within MAC address tables of edge switches.

In this example, client 132 connects to port 1 of edge switch 122 and data frames from client 132 are received on port 1 of edge switch 122. By MAC address learning, a mapping of MAC2 of client 132 to port 1 of edge switch 122 is stored in the MAC address table of edge switch 122 as shown in Table 1 (below).

TABLE 1

| MAC Address Table of edge switch 122 | |
|---|---|
| MAC address | Port Number |
| MAC2 | 1 |

Similarly, client 132 also connects to port 1 of edge switch 123 and data frames from client 132 are received on port 1 by edge switch 123. By MAC address learning, a mapping of MAC2 of client 132 to port 1 of edge switch 123 is stored in the MAC address table of edge switch 123 as shown in Table 2 (below).

TABLE 2

| MAC Address Table of edge switch 123 | |
|---|---|
| MAC address | Port Number |
| MAC2 | 1 |

At block 203, a spine switch learns multiple links between a client device and the spine switch. In the present example, spine switch 111 may learn the multiple links between client 132 and spine switch 111 through different ways.

EXAMPLE 1

A spine switch learns multiple links between the spine switch and a client device through data frames received on multiple ports of the spine switch from the client device.

In this example, a data frame is transmitted from client 132 and forwarded by edge switch 122 to port 2 of spine switch 111. Spine switch 111 learns a first link between client 132 and spine switch 111 and stores the mapping of MAC2 of client 132 with port 2 in a MAC address table as shown in Table 3 (below).

TABLE 3

| MAC Address Table of spine switch 111 at $t_1$ | |
|---|---|
| MAC address | Port Number |
| MAC2 | 2 |

Another data frame is transmitted from client 132 and forwarded by edge switch 123 to port 3 of spine switch 111. Spine switch 111 learns a second link between client 132 and spine switch 111 instead of re-aligning the MAC2 of client 132 to port 3. Spine switch 111 may also store the mapping of MAC2 of client 132 with port 3 in its MAC address table as shown in Table 4 (below) and MAC address table of spine switch 111 now contains two links between spine switch 111 and client 132.

TABLE 4

| MAC Address Table of spine switch 111 at $t_2$ | |
|---|---|
| MAC address | Port Number |
| MAC2 | 3 |
| MAC2 | 2 |

EXAMPLE 2

A spine switch learns the multiple links through MAC address tables shared by edge switches.

In this example, MAC address tables learned by edge switches 122 and 123, such as those represented by Tables 1 and 2 (above), are shared with spine switch 111. For example, edge switches 122 and 123 may be managed by a network management protocol (e.g., Simple Network Management Protocol (SNMP)). Spine switch 111 may retrieve the MAC address tables from edge switches 122 and 123 by sending an SNMP request periodically and responsive thereto edge switches 122 and 123 may share the MAC address tables with spine switch 111. In another example, an edge switch 122/123 may provide its MAC address table to spine switch 111 when a new MAC address is learned/moved/aged in its edge switch. Spine switch 111 may also know the link between a particular edge switch and spine switch 111. In the present example, spine switch 111 may know that is edge switch 122 is connected to port 2 and edge switch 123 is connected to port 3. Spine switch 111 may retrieve the MAC address (i.e., MAC2) of client 132 from the MAC address table of edge switch 122 and find a first link to client 132 by mapping MAC2 of client 132 with the port (i.e., port 2) to which edge switch 122 connects to spine switch 111. Similarly, spine switch 111 may retrieve the MAC address (i.e., MAC2) of client 132 from the MAC address table of edge switch 123 and find a second link to client 132 by mapping MAC2 of client 132 with its port (port 3) to which the edge switch 123 is connected. Because the same MAC address of client 132 is found in multiple MAC address tables of its edge switches 122/123, in this manner spine switch 111 learns the existence of multiple links between client 132 and edge switches 122/123.

EXAMPLE 3

Spine switch learns the multiple links through MAC address tables shared by other spine switches.

In this example, a MAC address table learned by spine switch 111 may be shared with other spine switches of the Clos network. For example, spine switches 111 and 112 may periodically exchange their respective MAC address tables with each other through, for example, SNMP messages. Therefore, when spine switch 112 learns the multiple links between spine switch 112 and client 132 and shares its MAC address table with spine switch 111, spine switch 111 that has the same configuration as spine switch 112 may also be made aware of the multiple links.

EXAMPLE 4

Spine switch learns the multiple links from its own network traffic and a MAC address table shared by an edge switch.

In this example, a data frame is transmitted from client 132 and forwarded by edge switch 122 to port 2 of spine switch 111. Spine switch 111 learns a first link between client 132 and spine switch 111 and stores the first link of MAC2 of client 132 with port 2 (MAC2-port2) in its MAC address table as shown in Table 3 (above).

In this example, another data frame of client 132 is dispatched to edge switch 123 and is then forwarded to port 3 of spine switch 112. Therefore, spine switch 111 does not receive data frame from client 132 on its other ports and does not learn the other link to client 132. In this case, edge switch 123 learns the MAC address of client 132 and has a MAC address table as shown in Table 2 (above). The MAC address table (Table 2) of edge switch 123 may be shared with spine switch 111 as mentioned above in Example 2. Spine switch 111 may retrieve the MAC address (i.e., MAC2) of client 132 from the MAC address table of edge switch 123. As edge switch 123 is connected to port 3 of spine switch 111, spine switch 111 may determine the second MAC2-port3 link between client 132 and spine switch 111.

EXAMPLE 5

Spine switch learns the multiple links from its own network traffic and a MAC address table shared by another spine switch.

In this example, a data frame is transmitted from client 132 and forwarded by edge switch 122 to port 2 of spine switch 111. Spine switch 111 learns a first link between client 132 and spine switch 111 and stores the first link of MAC2 of client 132 with port 2 (MAC2-port2) in a MAC address table as shown in Table 3 (above).

Another data frame of client 132 is dispatched to edge switch 123 and forwarded to port 3 of spine switch 112. Therefore, spine switch 111 does not receive data frame from client 132 and does not learn the other link to client 132. In this case, spine switch 112 learns the second link between port 3 of spine switch 112 and client 132 and spine switch 112 has a MAC address table as shown in Table 5.

TABLE 5

MAC Address Table of spine switch 112

| MAC address | Port Number |
|---|---|
| MAC2 | 3 |

Spine switch 112 may share its MAC address table (Table 5) with spine switch 111 and spine switch 111 may learn the second link between MAC2 of client 132 with port 3 of spine switch 112. As spine switch 111 has the same configuration as spine switch 112, spine switch 111 learns that the same link to MAC2 of client 132 also exists with itself.

At block 204, the multiple links between client 132 and spine switch 111 in its MAC address table are aggregated as a link group. A global MAC address table may be created by spine switch 111 as shown in Table 6.

TABLE 6

Global MAC Address Table of spine switch 111

| MAC address | Port Number | Virtual Port |
|---|---|---|
| MAC2 | 2 | VP_1 |
| MAC2 | 3 | VP_1 |
| MAC1 | 2 | VP_2 |
| MAC1 | 1 | VP_2 |

In Table 6 (above), a link group is created for the multiple links between client 132 and spine switch 111 while another link group is created for the multiple links between client 131 and spine switch 111. A unique virtual port number may be assigned to each link group to identify the link group.

The global MAC address table may be shared with other spine switches of the Clos network. When spine switch 111 receives global MAC address tables shared by other spine switches, links to the same MAC address contained in its own global MAC address table and the shared global MAC address tables may be grouped within a link group for that MAC address.

Those skilled in the art will appreciate that a LAN may be divided into one or more virtual LANs (VLANs) and each VLAN may be assigned with a VLAN ID. Each client may belong to one or more VLANs and the MAC address tables learned by switches of the Clos network may contain mappings among MAC addresses, VLAN IDs and/or ports. A simplified example of a global MAC address table that contains mappings to VLAN IDs is shown below in Table 7.

TABLE 7

Global MAC Address Table with Mappings to Port Numbers and VLAN IDS

| MAC address | Port Number | VLAN | Virtual Port |
|---|---|---|---|
| MAC2 | 2 | VLAN1 | VP_1 |
| MAC2 | 3 | VLAN1 | VP_1 |
| MAC1 | 2 | VLAN2 | VP_2 |
| MAC1 | 1 | VLAN2 | VP_2 |

At block 205, a spine switch (e.g., spine switch 111) receives ingress data frames that are destined for a client (e.g., client 132), wherein the destination MAC address of the ingress data frames is the MAC address of the client.

Assuming the ingress data frames are destined for client 132, the destination MAC address would be MAC2.

At block 206, the spine switch dispatches the ingress data frames to one of the ports known to be connected to the client to which the ingress data frames are destined. Continuing with the example in which ingress data frames have been received by spine switch 111 that are destined for client 132, spine switch 111 dispatches the ingress data frames to one of the ports that are connected to client 132 and forwards the ingress data frames to client 132 through the edge switches. As there are multiple links between client 132 and spine switch 111, the ingress data frames to be forwarded to client 132 may alternatively be distributed evenly among the multiple links. In such an embodiment, when ingress data frames are received, spine switch 111 may retrieve the destination MAC address (i.e., MAC2) from the ingress data frames and look it up in its global MAC address table. If a link group/virtual port number (VP_1) is found within the global MAC address table for the MAC address at issue (i.e., MAC2), each of the ingress data frames is dispatched to a member port (in this case, port 2 or 3) of the virtual port based on a load balancing algorithm, for example, round robin scheduling. Therefore, the ingress data frames are distributed evenly among multiple ports and are forwarded to client 132 through multiple edge switches.

At block 207, learns that a MAC address has moved or been aged out. In the context of the present example, spine switch 111 may detect a MAC address has moved or been aged out by, for example, sending out a frame to all member ports (port 2 and 3) within a virtual port (VP_1) when a MAC address (MAC2) is aged out from the global MAC address table. If no response is received on a member port, then spine switch 111 may determine that client 132 is not connected to the port and this member link is broken. In another example, the moving or aging may be learned by other spine switches or edge switches and this information may be shared with spine switch 111.

At block 208, the link group for the MAC address at issue is updated by the spine switch. For example, spine switch 111 may update a link group if there is a change in the member links for that link group. For example, if a member link no longer exists as detected at block 207, the member link is removed from the link group of the client.

Figure 3:
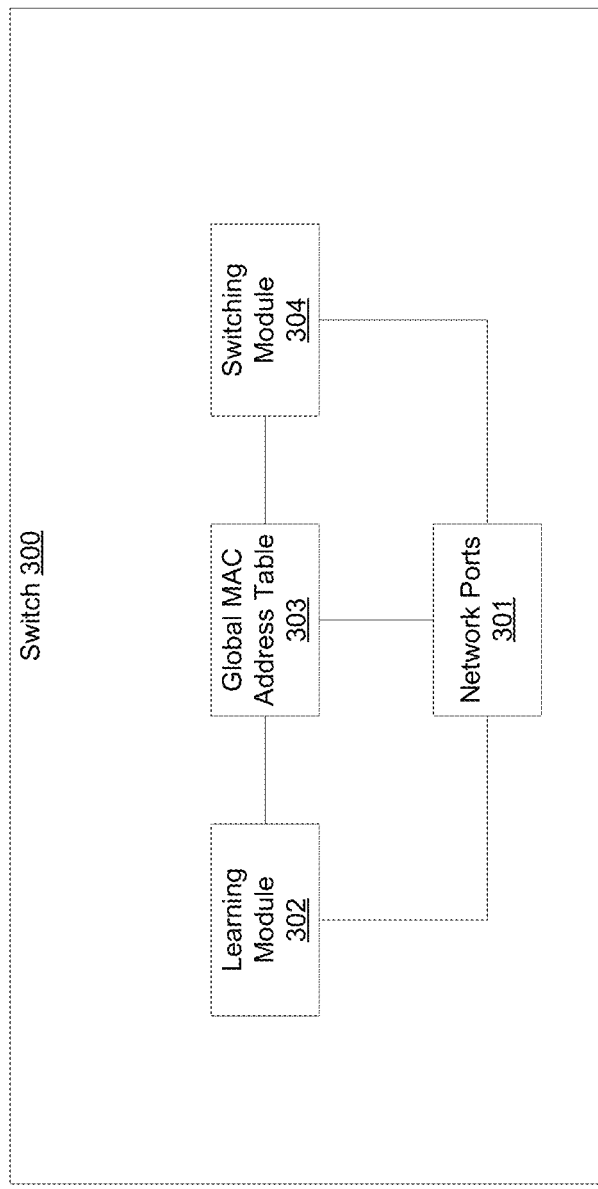
FIG. 3 illustrates exemplary functional units of a spine switch of a Clos network in accordance with an embodiment of the present invention.

FIG. 3 illustrates exemplary functional units of a switch 300 in accordance with an embodiment of the present invention. Switch 300 comprises Ethernet ports 301, a learning module 302, a global MAC address table 303 and a switching module 304. Switch 300 may represent a spine switch of the Clos network of FIG. 1 or 2.

Ethernet ports 301 are used for connecting to multiple edge switches. As noted above, in a Clos network, a client device may comprise multiple single-port NICs or a multiple-port NIC that are connected to multiple edge switches. The NICs or multiple-port NIC may be bonded as a virtual NIC and data frames may be dispatched among the ports and transmitted to edge switches. When data frames from the client device are received by the multiple edge switches, the data frames are forwarded from the multiple edge switches to spine switch 300. Therefore, switch 300 may have multiple links with the client device via the edge switches and may receive data frames from the client on multiple ports of Ethernet ports 301.

Learning module 302 is used for learning the multiple links between switch 300 and a client device. In one example, learning module 302 may learn the multiple links with the client by observing source MAC addresses of the data frames received on ports 301. When a data frame of a client is received on a first port of ports 301, learning module 302 may map the source MAC address of the data frame, which is the MAC address of the client that originated the data frame, to the first port on which the data frame was received. Learning module 302 may store the first link between the first port and MAC address of the client device within global MAC address table 303. When a data frame of the same client is received on a second port of ports 301, learning module 302 may create a second mapping of the MAC address of the client to the second port on which the data frame was received. Learning module 302 may store the second link between the second port and MAC address of the client device within global MAC address table 303. When there are multiple links to a given MAC address, learning module 302 may create a link group for the multiple links within global MAC address table 303. A virtual port number may also be assigned to the member links of the link group. When the client device is assigned to a virtual LAN, a member link may comprise a mapping of a MAC address and VLAN ID with a port of Ethernet ports 301. Global MAC address table 303 may be shared with other spine switches of the Clos network and global MAC address tables of other spine switches may be acquired by learning module 302. When learning module 302 acquires a global MAC address table from another spine switch with the same configuration, link groups of the other spine switch may be incorporated into global MAC address table 303 as described above.

Learning module 302 may also acquire MAC address tables from edge switches that are connected to switch 300. Each edge switch keeps learning MAC address tables from data frames that are received by the edge switch. As a client device is connected to multiple edge switches and data frames are transmitted to the multiple edge switches from the client device, each of the multiple edge switches may establish a MAC address table that comprise the link between the client device and the edge switch. Learning module 302 may acquire MAC address tables from the multiple edge switches and extract the MAC address of the client device from the MAC address tables. Learning module 302 may also have knowledge regarding the port number to which each edge switch is connected. Therefore, learning module 302 may map a MAC address of client device extracted from a MAC address table of an edge switch to the port number associated with the edge switch as a link between the client device with switch 300. If multiple links are found within the MAC address tables of the multiple edge switches or one link is learned by learning module 302 from data traffic of a client device and one link to the same client device is learned from a MAC address table acquired from an edge switch, learning module 302 may create a link group and assign a virtual port number to these links within global MAC address table 303.

Learning module 302 may detect if a link between a client device and switch 300 still exist by sending a data frame through the link. If no response is received on the link, learning module 302 may determine that the link is broken and the link may be removed from the link group for the client device.

Switching module 304 is used for determining the port on which a data frame received by switch 300 is to be forwarded. When a data frame is received on a port of ports 301, switching module 304 checks the destination MAC address of the data frame within global MAC address table to determine whether the MAC address is part of a link group. If the MAC address is associated with a link group, switching module 304 may select a member port of the link group based on a round robin scheduling algorithm to dispatch the data frame onto the selected member port. The data frame is then forwarded to the client device through an edge switch that is connected to the member port. Therefore, network traffic destined for the client device may be distributed evenly among multiple links to the client device.

Figure 4:
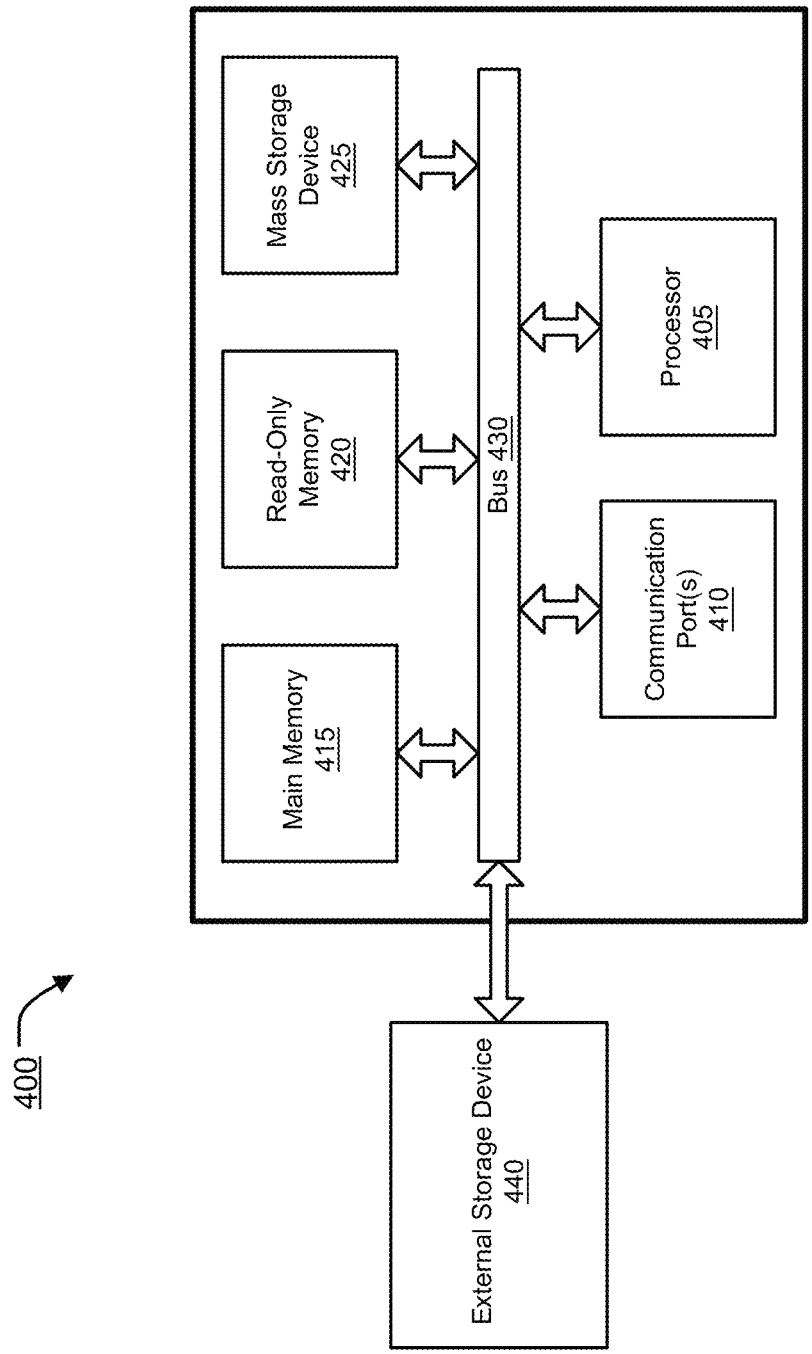
FIG. 4 is an exemplary computer system in which or with which embodiments of the present invention may be utilized.

FIG. 4 is an example of a computer system 400 with which embodiments of the present disclosure may be utilized. Computer system 400 may represent or form a part of a spine switch (e.g., spine switch 111 or 112) or an edge switch (e.g., edge switch 121, 122 or 123) of a Close network.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 400 includes a bus 430, a processor 405, communication port 410, a main memory 415, a removable storage media 440, a read only memory 420 and a mass storage 425. A person skilled in the art will appreciate that computer system 400 may include more than one processor and communication ports.

Examples of processor 405 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 405 may include various modules associated with embodiments of the present invention.

Communication port 410 can be any of an RS-232 port for use with a modem based dialup connection, a 10/100 Ethernet port, a Gigabit or 10 Gigabit port using copper or fiber, a serial port, a parallel port, or other existing or future ports. Communication port 410 may be chosen depending on a network, such a Local Area Network (LAN), Wide Area Network (WAN), or any network to which computer system 400 connects.

Memory 415 can be Random Access Memory (RAM), or any other dynamic storage device commonly known in the art. Read only memory 420 can be any static storage device(s) such as, but not limited to, a Programmable Read Only Memory (PROM) chips for storing static information such as start-up or BIOS instructions for processor 405.

Mass storage 425 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 430 communicatively couples processor(s) 405 with the other memory, storage and communication blocks. Bus 430 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 405 to system memory.

Optionally, operator and administrative interfaces, such as a display, keyboard, and a cursor control device, may also be coupled to bus 430 to support direct operator interaction with computer system 400. Other operator and administrative interfaces can be provided through network connections connected through communication port 410.

Removable storage media 440 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   receiving, by a first spine switch of a Clos network, a Media Access Control (MAC) address table shared by a second network device of the Clos network, wherein the MAC address table comprises at least one mapping of a MAC address with a port learned by the second network device;
   learning, by the first spine switch, a first mapping of a Media Access Control (MAC) address of a client device to a first port of the first spine switch and a second mapping of the MAC address of the client device to a second port of the first spine switch, wherein the client device is coupled to a first edge switch and a second edge switch of the Clos network and the first edge switch is coupled to the first port of the first spine switch and the second edge switch is coupled to the second port of the first spine switch, wherein at least one of the first mapping and the second mapping is learned from the MAC address table shared by the second network device;
   creating within a first MAC address table, by the first spine switch, a link group for the MAC address of the client having a plurality of member links by aggregating the first mapping and the second mapping; and
   distributing, by the first spine switch, network traffic destined for the MAC address of the client among the plurality of member links of the link group.

2. The method of claim 1, wherein said learning further comprises:
   learning, by the first spine switch, the first mapping by observing network traffic received from the client device on the first port;
   learning, by the first spine switch, the second mapping by observing network traffic received from the client on the second port; and
   storing, by the first spine switch, the first mapping and the second mapping within the first MAC address table.

3. The method of claim 2, further comprising sharing, by the first spine switch, the first MAC address table with a second spine switch of the Clos network.

4. The method of claim 1, wherein said learning further comprises receiving, by the first spine switch, a second MAC address table shared by a second spine switch of the Clos network, wherein the second MAC address table contains a link group including the first mapping and the second mapping.

5. The method of claim 1, wherein said learning further comprises:
learning, by the first spine switch, the first mapping of the MAC address of the client device to the first port by observing network traffic received from the client device on the first port; and
receiving, by the first spine switch, on the second port a second MAC address table shared by a second spine switch of the Clos network, wherein the second MAC address table contains the second mapping.

6. The method of claim 1, wherein said learning further comprises:
receiving, by the first spine switch, a first edge MAC address table shared by the first edge switch, wherein the first edge MAC address table contains the MAC address of the client device;
receiving, by the first spine switch, a second edge MAC address table shared by the second edge switch, wherein the second edge MAC address table contains the MAC address of the client device;
creating, by the first spine switch, the first mapping of the MAC address of the client device and the first port based on the first edge MAC address table; and
creating, by the first spine switch, the second mapping of the MAC address of the client device to the second port based on the second edge MAC address table.

7. The method of claim 1, wherein said learning further comprises:
learning, by the first spine switch, the first mapping of the MAC address of the client device to the first port by observing network traffic received from the client device on the first port;
receiving, by the first spine switch, a second edge MAC address table shared by the second edge switch, wherein the second edge MAC address table contains the MAC address of the client device; and
creating, by the first spine switch, the second mapping of the MAC address of the client device to the second port based on the second edge MAC address table.

8. The method of claim 1, further comprising:
detecting, by the first spine switch, whether a member link of the plurality of member links has moved or aged; and
when a result of said detecting is affirmative, then updating, by the first spine switch, the link group accordingly.

9. The method of claim 1, wherein the first mapping also includes information regarding a virtual local area network identifier (VLAN ID) with which the client device is associated.

10. The method of claim 1, wherein said receiving comprises receiving the MAC address table via a Simple Network Management Protocol (SNMP) message originated by the second network device.

11. A spine switch of a Clos network, the spine switch comprising:
non-transitory storage device having embodied therein instructions representing a learning module and a switching module; and
one or more processors coupled to the non-transitory storage device and operable to execute the learning module and the switching module to perform a method comprising:
receiving a Media Access Control (MAC) address table shared by a second network device of the Clos network, wherein the MAC address table comprises at least one mapping of a MAC address with a port learned by the second network device;
learning a first mapping of a Media Access Control (MAC) address of a client device to a first port of the spine switch and a second mapping of the MAC address of the client device to a second port of the spine switch, wherein the client device is coupled to a first edge switch and a second edge switch of the Clos network and the first edge switch is coupled to the first port of the spine switch and the second edge switch is coupled to the second port of the spine switch, wherein at least one of the first mapping and the second mapping is learned from the MAC address table shared by the second network device;
creating within a first MAC address table a link group for the MAC address of the client having a plurality of member links by aggregating the first mapping and the second mapping; and
distributing network traffic destined for the MAC address of the client among the plurality of member links of the link group.

12. The spine switch of claim 11, wherein said learning further comprises:
learning the first mapping by observing network traffic received from the client device on the first port;
learning the second mapping by observing network traffic received from the client on the second port; and
storing the first mapping and the second mapping within the first MAC address table.

13. The spine switch of claim 12, wherein the method further comprises sharing the first MAC address table with a second spine switch of the Clos network.

14. The spine switch of claim 11, wherein said learning further comprises receiving a second MAC address table shared by a second spine switch of the Clos network, wherein the second MAC address table contains a link group including the first mapping and the second mapping.

15. The spine switch of claim 11, wherein said learning further comprises:
learning the first mapping of the MAC address of the client device to the first port by observing network traffic received from the client device on the first port; and
receiving on the second port a second MAC address table shared by a second spine switch of the Clos network, wherein the second MAC address table contains the second mapping.

16. The spine switch of claim 11, wherein said learning further comprises:
receiving a first edge MAC address table shared by the first edge switch, wherein the first edge MAC address table contains the MAC address of the client device;
receiving a second edge MAC address table shared by the second edge switch, wherein the second edge MAC address table contains the MAC address of the client device;
creating the first mapping of the MAC address of the client device and the first port based on the first edge MAC address table; and creating the second mapping of the MAC address of the client device to the second port based on the second edge MAC address table.

17. The spine switch of claim 11, wherein said learning further comprises:
learning the first mapping of the MAC address of the client device to the first port by observing network traffic received from the client device on the first port;
receiving a second edge MAC address table shared by the second edge switch, wherein the second edge MAC address table contains the MAC address of the client device; and
creating the second mapping of the MAC address of the client device to the second port based on the second edge MAC address table.

18. The spine switch of claim 11, wherein the method further comprises:
detecting whether a member link of the plurality of member links has moved or aged; and
when a result of said detecting is affirmative, then updating the link group accordingly.

19. The spine switch of claim 11, wherein the first mapping also includes information regarding a virtual local area network identifier (VLAN ID) with which the client device is associated.

20. The spine switch of claim 11, wherein said receiving comprises receiving the MAC address table via a Simple Network Management Protocol (SNMP) message originated by the second network device.

* * * * *